(12) United States Patent
McIlwain et al.

(10) Patent No.: US 6,481,520 B2
(45) Date of Patent: Nov. 19, 2002

(54) SKID STEER LOADER FOREARM REST

(75) Inventors: Irwin D. McIlwain, Lancaster, PA (US); Clayton E. Banks, Jr., Brownstown, PA (US)

(73) Assignee: New Holland and North America, Inc., New Holland, PA (US)

( * ) Notice: Subject to any disclaimer, the term of this patent is extended or adjusted under 35 U.S.C. 154(b) by 0 days.

(21) Appl. No.: 10/038,437

(22) Filed: Jan. 7, 2002

(65) Prior Publication Data

US 2002/0117884 A1 Aug. 29, 2002

Related U.S. Application Data

(62) Division of application No. 09/668,964, filed on Sep. 25, 2000, now Pat. No. 6,406,097.

(51) Int. Cl.⁷ .................................................. B62D 33/06
(52) U.S. Cl. .............................. 180/89.12; 297/411.21
(58) Field of Search ........................... 297/217.1, 411.2, 297/411.32, 411.45, 411.22, 411.36, 411.35, 488, 411.21; 180/89.12, 89.1; 248/118; 296/190.01, 71, 153, 35.1; 280/727, 751

(56) References Cited

U.S. PATENT DOCUMENTS

RE19,721 E * 10/1935 Genung
2,325,292 A * 7/1943 Westrope
2,675,892 A * 4/1954 Wagner
2,760,813 A * 8/1956 Colm
3,165,357 A * 1/1965 Ruedemann, Jr.
3,583,518 A * 6/1971 Bichel et al.
4,300,788 A * 11/1981 Sperling
4,537,446 A * 8/1985 Roney et al.
4,579,191 A * 4/1986 Klee et al.
4,616,872 A * 10/1986 Akira et al.
5,050,700 A * 9/1991 Kim

* cited by examiner

Primary Examiner—Milton Nelson, Jr.
(74) Attorney, Agent, or Firm—John William Stader; Larry W. Miller

(57) ABSTRACT

The device relates to a pivoting forearm rest positioned behind the hand controls of a skid steer loader. The device consists of a tube with an angled portion inserted into a 'J' shaped support bracket. The bracket is affixed to the cab sidewall and may be vertically adjusted. The rotation of the tube is adjusted by a tension bolt and shim within the support bracket. The tube has a pin seated within a tube slot in the support bracket which allows the tube to rotate 180 degrees. A portion of the tube and the support bracket are covered in padding.

3 Claims, 5 Drawing Sheets

SKID STEER LOADER FOREARM REST

This is a divisional of application Ser. No. 09/668,964 filed on Sep. 25, 2000, now U.S. Pat. No. 6,406,097.

BACKGROUND OF INVENTION

1. Field of Art

This invention relates to an improvement in a skid steer loader. More specifically it relates to the forearm rests positioned behind the hand controls of a loader.

2. Description of Prior Art

Skid steer loaders have been used for several decades as an efficient construction and agricultural machine for lifting and moving materials. Basically, the loader consists of a boom and bucket arrangement propelled by a prime mover. A generally conventional skid loader is illustrated in FIG. 1. For further examples of conventional skid loaders, please see the Case Corporation skid steer loader model no. 1845™ or New Holland North America, Inc. skid steer loader model no. Lx 865™. An engine is operably connected to the wheels and lift cylinder. The lift cylinder is used to either raise or lower the bucket which has a pivoting bucket attached at the end. An operator positioned in the cab may view and control the various motions of the skid steer loader. Unlike other types of vehicles, the skid steer loader lacks a steerable axle. To turn a skid steer loader, the wheels on either the left or right side rotate in a particular direction while the wheels on the opposite side either counter-rotate or stay fixed. To control the movement of the loader, boom and bucket several control options have been developed. One option is the use of both foot pedals and hand controls positioned in the cab. In this arrangement, the foot pedals control the ground motion of the loader and the hand controls operate the boom and bucket. Conversely, in some configurations, the foot pedal controls the boom and bucket and the hand control operates the ground motion of the loader. Finally, in some skid steer loader designs, the hand controls operate the loader ground motion, boom and bucket. This final configuration has created several problems. By making the hand controls the sole means for operating the skid steer loader, it can be frequently difficult for an operator to manipulate the hand controls for long period times with the necessary precision. This coupled with the fact that the loader may be operating in rough terrain making the operation of hand controls even more difficult. Therefore a forearm rest positioned behind the hand controls is desirable.

The prior art illustrates several difficulties relating to various rests used in construction vehicles. Specifically, U.S. Pat. No. 3,165,357 illustrates a vehicle safety seat that has a rest mechanism. However, the mechanism is complex and is an armrest instead of a forearm rest. U.S. Pat. No. 4,579,191 discloses an operator restraint system that uses a series of pulleys to place a pair of restraint arms about the operator. Again, the device is positioned about the operator's waist and is complex. It is also not adjustable to a wide variety of positions. U.S. Pat. No. 4,300,788 discloses a passive restraint system. U.S. Pat. No. 5,129,478 discloses a seat occupant-restraining device that again is complex and expensive. U.S. Pat. No. 4,537,446 illustrates a safety seat. This restraint is not easily adjustable and requires fairly precise alignment to get the rest into position.

Consequently, the need exists for a low cost and easily adjustable forearm rest for an operator using the hand controls of a skid steer loader.

OBJECTS OF THE INVENTION

It is an object of the present invention to provide pivoting forearm rests for a skid steer loader.

It is a further object of the present invention to provide a pivoting forearm rest that is easy to assemble and affix to a skid steer loader.

It is a further object of the present invention to provide a pivoting forearm rest that attaches to the wall of the skid steer loader and not to the seat.

It is a further object of the present invention to provide a pivoting forearm rest that can be adjusted to multiple positions to allow for operator comfort.

It is a further object of the present invention to provide a pivoting forearm rest that can be re-positioned to allow for easy operator entry or egress from the cab.

It is the further object of the present invention to provide a pivoting forearm rest that steadies the operator's hand, while the operator's hand is manipulating the hand controls of a skid steer loader.

It is the further object of the present invention to provide a pivoting forearm rest that does not require springs, wires or pulleys to adjust the position of the rest.

SUMMARY OF THE INVENTION

The invention overcomes the deficiencies of the prior art. The invention is pivoting forearm rest that permits an operator to steady their hands while operating the hand controls. The invention consists of an angled tube inserted into a support bracket. The bracket is affixed to the cab's sidewall and behind the hand controls of the skid steer loader. The bracket is 'J'-shaped and the tube can be tensioned by means of a pair of tension bolts and shim. The tube has a pin that is seated in a tube to slot. The tube slot allows the tube to rotate 180 degree about an axis that is parallel to the direction of travel. The vertical height of the forearm rest can be adjusted by re-positioning the bracket by adjusting a wall bolt. Padding encircles a portion of the tube. A portion of the padding is flattened when the tube is oriented in the operating position. A bracket pad also covers the bracket.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
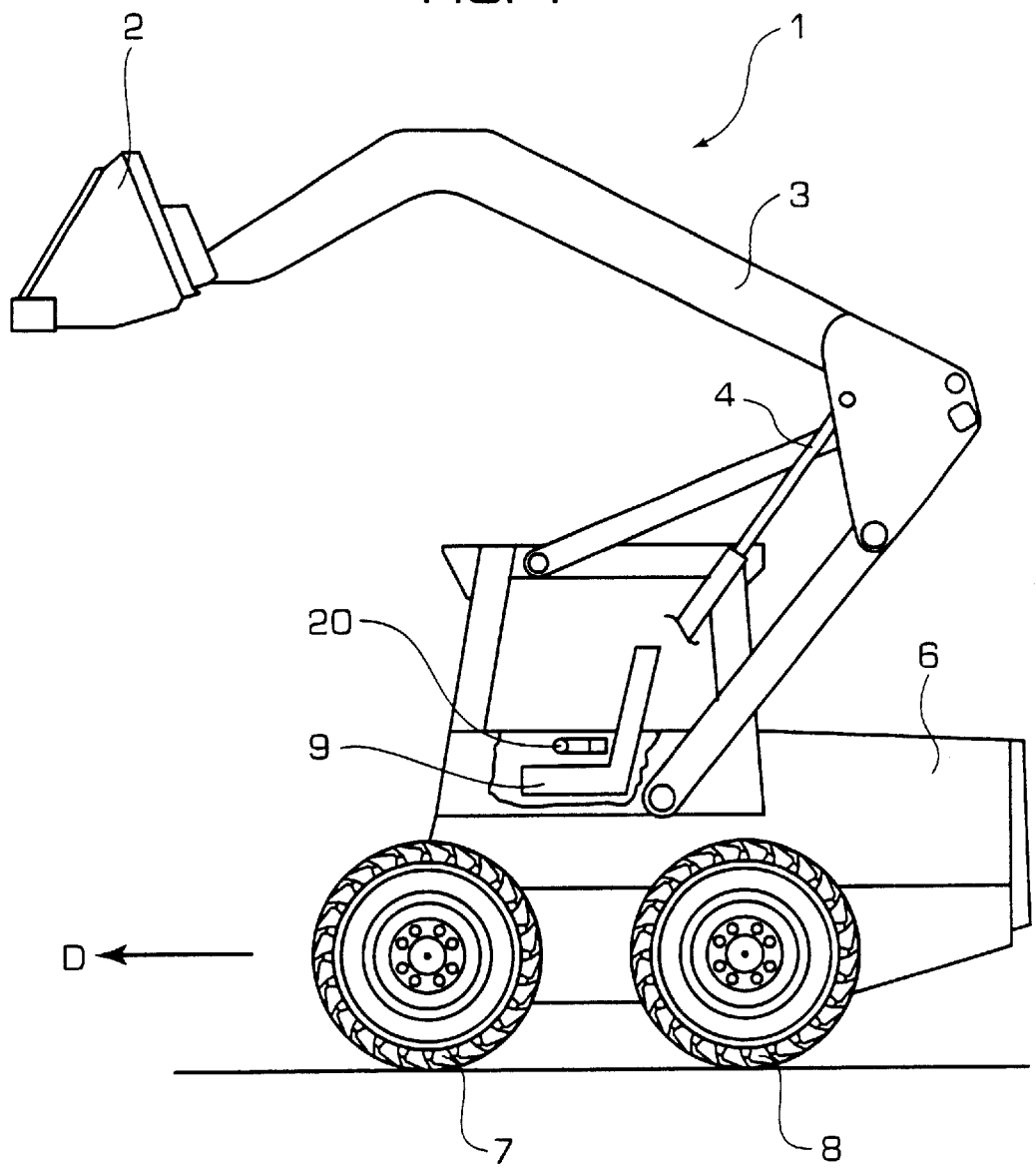
FIG. 1 is a general view of a skid steer loader.

Referring to the drawings, it is possible to observe the major elements and general operation of the present invention. Left and right references are used as a matter of convenience and are determined by standing at the rear of the skid steer loader and facing the forward end in the normal direction of travel D. Likewise, forward and rearward are determined by normal direction of travel of the skid steer loader. Upward or downward orientations are relative to the ground or operating surface. Horizontal or vertical planes are also relative to ground.

Figure 3:
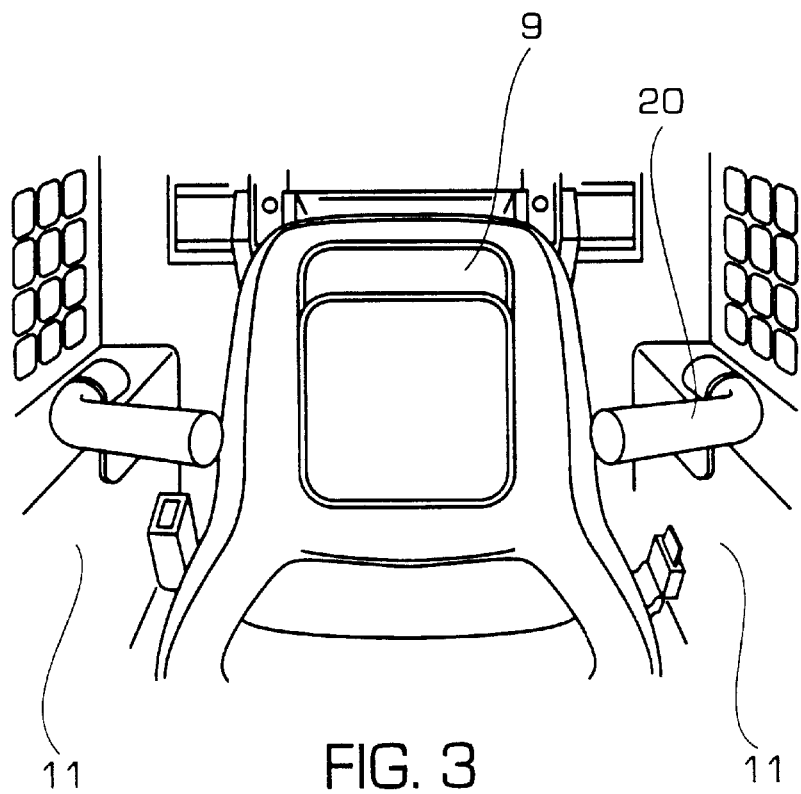
FIG. 3 is a front view of the forearm rests positioned relative to the operator's seat.
Figure 4:
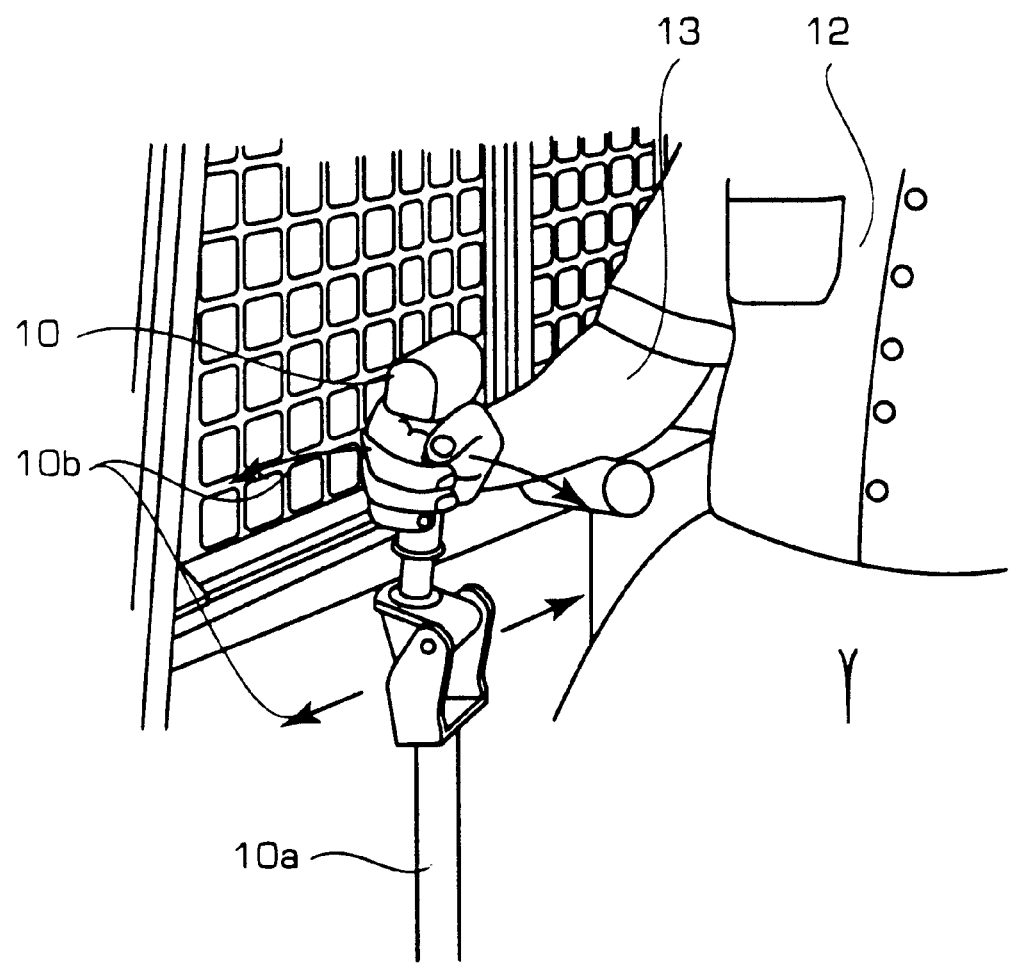
FIG. 4 is a side view showing the operator using the pivoting forearm rest.

FIG. 1 illustrates a conventional skid steer loader 1 having the present invention, the pivoting forearm rest 20. The loader 1 is supported by a pair of front wheels 7 (only one shown) and rear wheels 8 (only one shown). The loader 1 is moved and powered by an engine 5. A lift cylinder 4 (partially cut away) raises and lowers a boom 3 that is pivotally attached to the frame of the loader 1. At the distal end of the boom 3 is the bucket 2 for lifting and transporting various materials. It should be noted that besides a bucket 2, a variety of implements could be attached to the end of the boom 3. The control of the skid steer loader 1 is accomplished by an operator 12 (FIG. 4) positioned in the in the cab 5. The cab 5 has a seat 9 placed generally in the center of the cab 5. As seen in FIG. 4, the operator manipulates the hand control 10. A pair of hand controls 10 (only one shown) are attached to the loader floor (not shown) by a hand control tube 10a. The design and layout of the hand control 10 is used in several skid steer loaders. See specifically the Case Corporation skid steer loader model no. 1845™ or the 1800 series skid steer loader also manufactured by Case Corporation. In this design, all controls for the ground movement of the loader 1, the movement of the boom 3 and bucket 2 reside in the hand control 10 unit. As indicated by the motion arrows 10b, by moving the hand controller forward, the right-side wheels move forward. Conversely, by pulling the hand controller 10 rearwards, the right wheels movement rearward. By rotating the top of the controller outwards or inwards (relative to the cab's center), the boom or bucket may be moved. The controller 10 operates similarly on the left side. However, it would be tiring and difficult for the operator 12 to maintain a high degree of control for long periods of time and over uneven terrain. Hence, the present invention 20 has been placed proximate to the forearm 13 of the operator 12 to allow for support. The general position of the forearm support can be seen in FIG. 3. Generally speaking, the forearm rest is positioned midway between the hand control 10 and the seat back.

Figure 5:
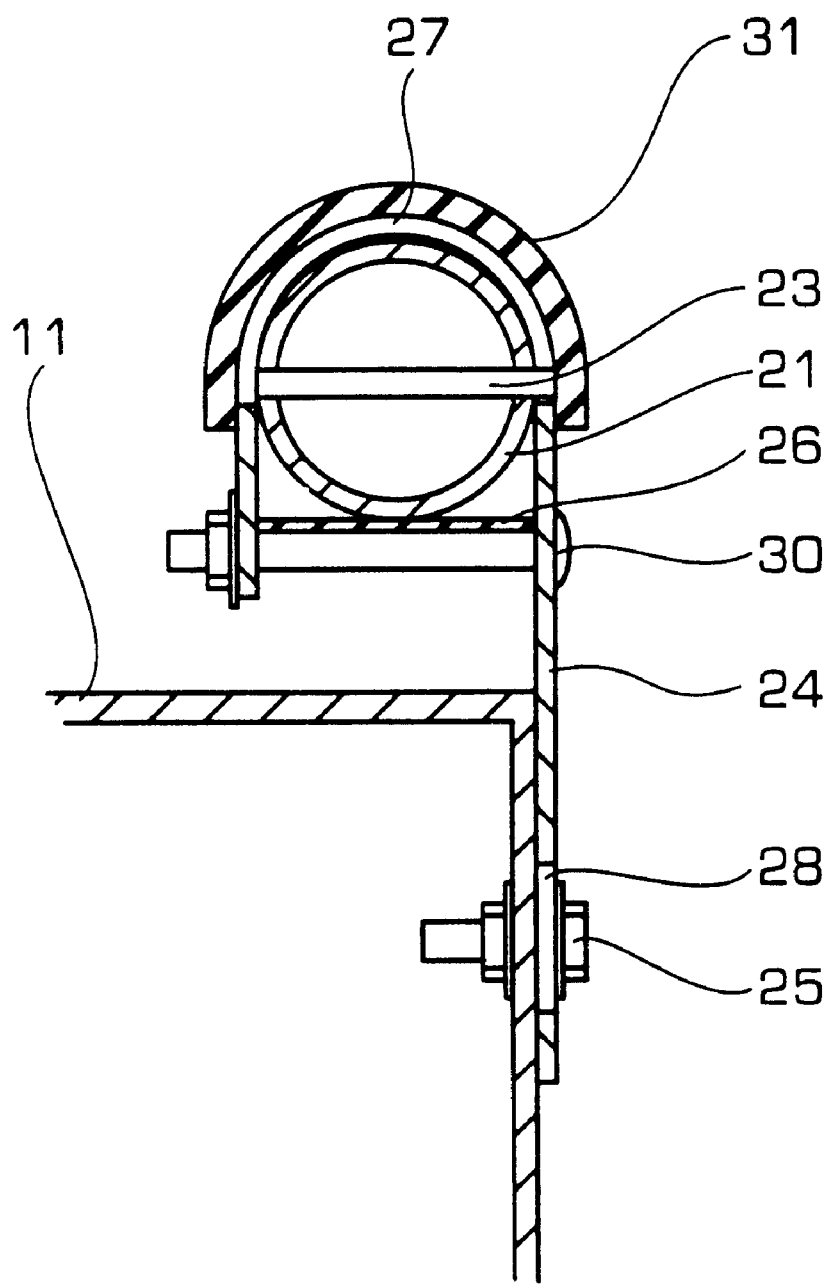
FIG. 5 is a cut away view of the pivoting forearm rest.
Figure 6:
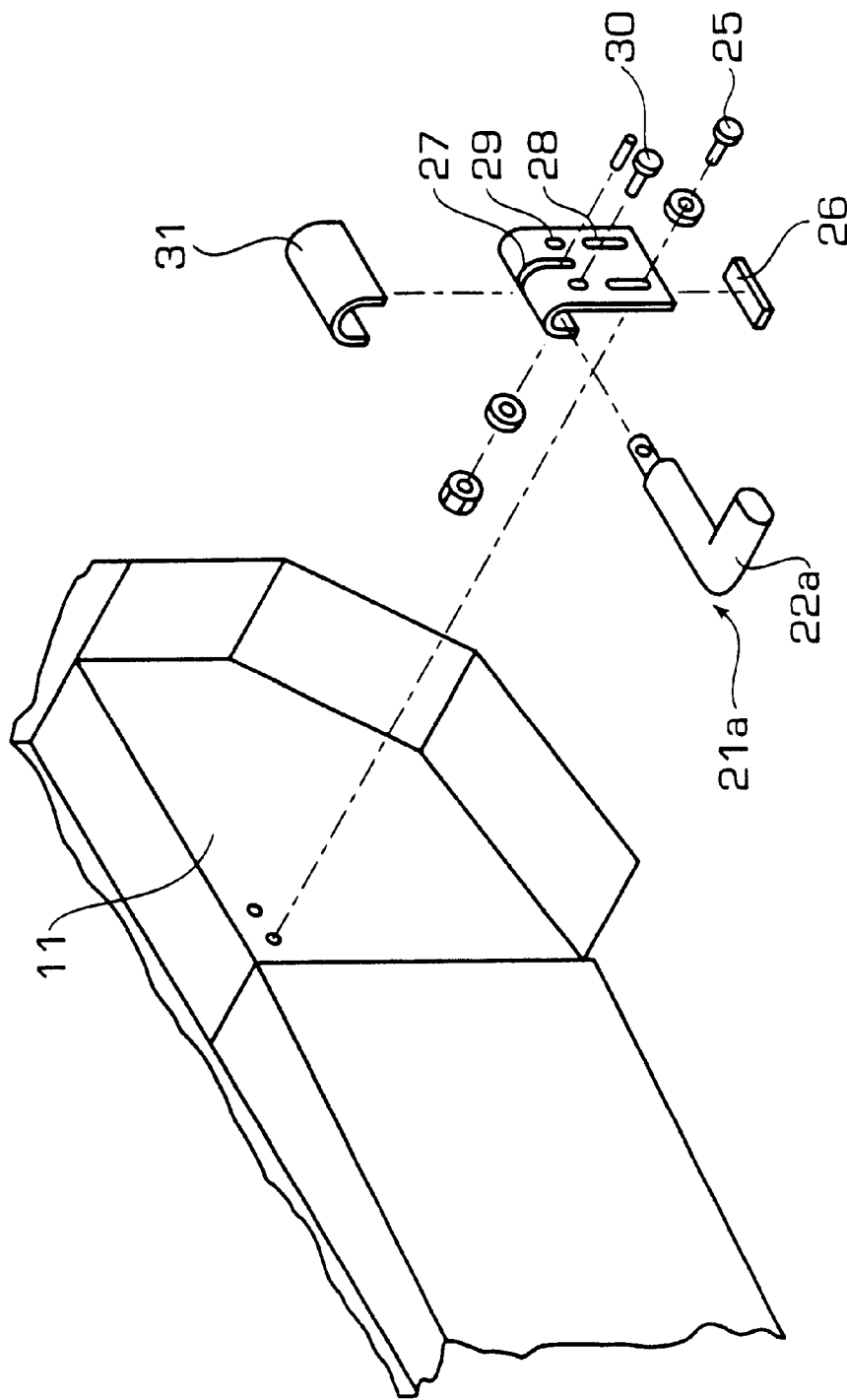
FIG. 6 is an exploded view of the various elements of the pivoting forearm rest.

Now that the general environment of the invention has been reviewed, the specific elements may be discussed. As best seen in FIGS. 5 and 6, the pivoting forearm rest 20 consists of a tube 21 inserted into the support bracket 24. The support bracket is mounted to the sidewall 11 of the cab 5.

The tube 21 has an angled portion 21a The forearm pad 22 covers the angled portion 21a There is a flattened surface 22a of the forearm pad 22. When the tube 21 is in the operating position 35 (as seen in FIG. 3), the flattened surface is horizontal. A pin 25 is inserted into the tube 21. The operation of the pin will be discussed later.

The support bracket 24 has a 'J' shape. The tube 21 is inserted into the curved portion 32 of the support bracket 24. A pair of wall bolts 25 affixes the bracket 24 to the sidewall 11. Each wall bolt 25 is inserted through an elongated wall slot 28 in the bracket 24. The slot 28 allows the support bracket to be vertically adjusted by loosening the wall bolts 25 and re-positioning the support bracket 24. The bracket 24 has tube slot 27. The pin 25 of the tube 21 is seated with the tube slot 27. As seen in cut away FIG. 5, the tube slot extends the width of the curved portion 32. By seating the pin 25 in the tube slot 27, the tube is held in position and can rotate only about the axis 37. This allows the tube 21 to rotate 180 degrees. Holding the tube 21 into the curved portion 32 is the tension bolts 30 which are inserted through a pair of tension slots 29. A shim 26 is inserted between the tension bolt 30 and tube 21. The ease of rotation of the tube 21 can be controlled by appropriate tightening of the tension bolts 30. The top of the curved portion 32 is covered by a bracket pad 31 to ensure operator comfort.

Figure 2:
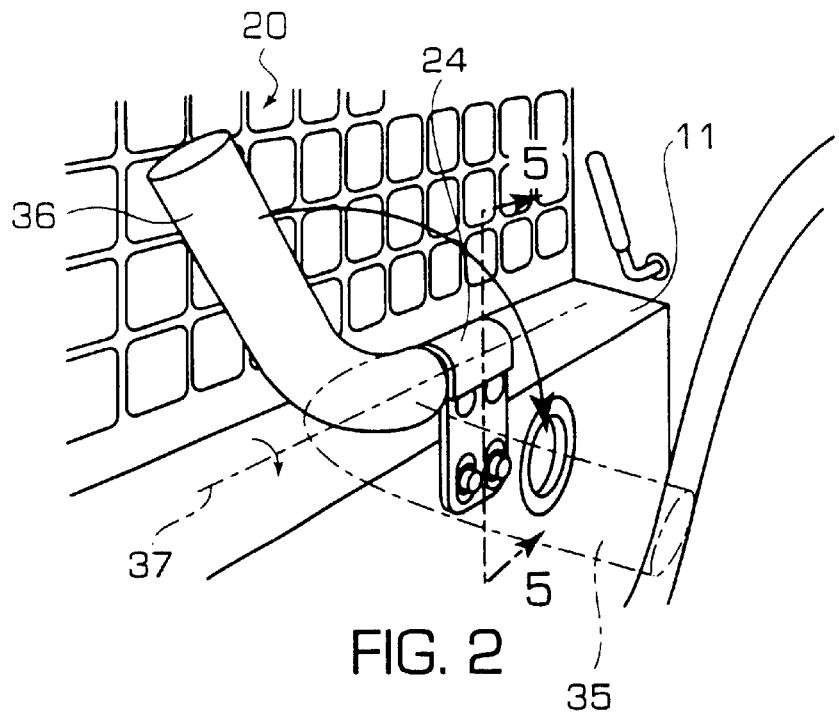
FIG. 2 is a perspective view of a pivoting forearm rest, showing in phantom the forearm rest in the operating position.

In operation, the forearm rest 20 is in the storage position 36 as seen in FIG. 2. After the operator 12 enters the cab 5, the operator 12 rotates the forearm rest 20 into the operating position 35. The forearm rest 20 rotates about an axis 37 that is parallel to Forward direction of travel D. Because of the tension bolt 30 and shim 26, the rest 20 can be positioned in a variety of settings, as the operator desires. The operator 12 may also raise or lower the entire forearm rest 20 by adjusting the wall bolt 25 with the elongated wall slot 26. While operating the hand controls 10, the operator's forearm 13 is steadied preventing undesirable motion on the hand controls 10. When the operator 12 desires to depart the cab 5, the forearm rest 20 is rotated about the axis 37. The tube slot 27 in the support bracket 24 allows the rest 20 to be rotated 180 degrees allowing the angled portion 21a to be rotated into the cab's sidewall 11.

It will be obvious to those skilled in the art that various changes may be made without departing from the scope of the invention and the invention is not to be considered limited to what is illustrated in the drawings and described in the specification.

What is claimed is:

1. In a skid steer loader, said loader having a pair of front wheels and a pair of rear wheels, said wheels propelled by an engine, a lift cylinder operably connected to the engine, said lift cylinder moves a boom and a bucket, a loader propulsion and boom and bucket movement controlled by an operator manipulating a pair of hand controls, said loader having a cab having an opposing pair of sidewalls and an operator's chair for an operator, the improvement comprising:

a. a support bracket slidably affixed to the sidewall, the bracket having an elongated wall slot, therein for receiving a wall bolt to attach to the sidewall, said bracket having a curved portion with tensioning means, the curved portion having a tube slot, therein; and b. a tube inserted into the curved portion, the tube having an angled portion and the angled portion encircled by a forearm pad, a pin affixed to the tube, the pin aligned with the tube slot, a rotational movement of the tube restricted by the tensioning means and the pin.

2. The invention described in claim 1 wherein the tensioning means further comprises a tension bolt inserted through the curved portion and a shim supporting the tube.

3. The invention described in claim 1 wherein said pin aligned with the tube slot limits the rotation of the tube to 180 degrees.

* * * * *